United States Patent
Blackburne et al.

(10) Patent No.: US 10,930,017 B1
(45) Date of Patent: Feb. 23, 2021

(54) IMAGE COMPRESSION OPTIMIZATION

(71) Applicant: Facebook, Inc., Menlo Park, CA (US)

(72) Inventors: Benjamin Patrick Blackburne, Baldock (GB); Campbell Orme, London (GB)

(73) Assignee: Facebook, Inc., Menlo Park, CA (US)

( * ) Notice: Subject to any disclaimer, the term of this patent is extended or adjusted under 35 U.S.C. 154(b) by 41 days.

(21) Appl. No.: 16/124,011

(22) Filed: Sep. 6, 2018

(51) Int. Cl.
*G06T 3/40* (2006.01)
*G06T 9/00* (2006.01)
*G06T 19/00* (2011.01)

(52) U.S. Cl.
CPC .......... *G06T 9/00* (2013.01); *G06T 3/40* (2013.01); *G06T 19/006* (2013.01)

(58) Field of Classification Search
CPC ........... G06T 9/00; G06T 19/006; G06T 3/40
See application file for complete search history.

(56) References Cited

U.S. PATENT DOCUMENTS

| | | | | |
|---|---|---|---|---|
| 5,021,976 A * | 6/1991 | Wexelblat | ........... | G06F 3/04817 345/581 |
| 6,031,939 A * | 2/2000 | Gilbert | ........... | H04N 19/147 375/E7.088 |
| 6,304,277 B1 * | 10/2001 | Hoekstra | ........... | G06T 11/60 345/600 |
| 8,290,311 B1 * | 10/2012 | Myers | ........... | G06Q 10/107 382/305 |
| 2003/0007695 A1 * | 1/2003 | Bossut | ........... | G06T 9/00 382/239 |
| 2013/0093779 A1 * | 4/2013 | Lyons | ........... | G09G 5/39 345/547 |
| 2014/0321764 A1 * | 10/2014 | Zarom | ........... | H04N 19/593 382/243 |

* cited by examiner

*Primary Examiner* — Sing-Wai Wu
(74) *Attorney, Agent, or Firm* — Baker Botts L.L.P.

(57) ABSTRACT

Particular embodiments may access one or more images configured to be used for generating an artificial reality (AR) effect. For each image, one or more compressed images may be generated using different compression settings, respectively. For each compressed image, a quality score may be computed based on that compressed image and the associated image from which the compressed image is generated. For each image, a desired quality threshold may be determined, and an optimal compression setting for that image may be determined based on the desired quality threshold and quality scores associated with the one or more compressed images generated from that image, wherein the optimal compression setting corresponds to one of the plurality of different compression settings. Each of the one or more images may be compressed using the associated optimal compression setting to generate and output one or more optimally-compressed images.

20 Claims, 9 Drawing Sheets
(4 of 9 Drawing Sheet(s) Filed in Color)

IMAGE COMPRESSION OPTIMIZATION

TECHNICAL FIELD

This disclosure generally relates to image processing, particularly to image compression.

BACKGROUND

Augmented Reality (AR) effects are computer-generated visual effects (e.g., images and animation) that are superimposed or integrated into a user's view of a real-world scene. Certain AR effects may be configured to be placed with objects in the real world. For example, a computer-generated unicorn may be visually placed on a real-world table. The augmented effect may be presented in a variety of ways. For example, the real-world table may be captured by the camera of a mobile smartphone and displayed in real-time through the device's display. In addition to displaying the table, the computing device may also display the unicorn, integrating it with the video of the table that is being displayed. As another example, a user may be viewing the real-world through AR glasses or viewing optics Like regular glasses, the AR glasses may have one or more lenses that are translucent so that the users may see real-world objects through the lenses. A computer-generated unicorn may be projected onto the lenses so that the unicorn is seen along with any real-world object that is visible through the lenses.

Computer-generated images are often used in artificial reality experiences (e.g., augmented reality and virtual reality), movies, video games, etc. AR effects, for example, may be created and deployed on a client device (e.g., a mobile computing device) from a remote system. To reduce the footprint of an AR effect and minimize its strain on system resources (e.g., storage, memory, transmission bandwidth, etc.), one solution is to reduce the file size of the AR effect. This may be achieved, for example, by compressing certain assets of the AR effect, such as a texture images.

Image compression is a type of data compression applied to digital images. Image compression usually involves encoding image data using less bits than that of the original digital images. While the size of the compressed image file may be reduced, the quality of the compressed image may also degrade. As such, selecting the proper compression for an image often requires striking the appropriate balance between file size and quality, depending on the specific needs of the particular application. To further complicate matters, compression quality and size depend on the particular features of the image being compressed. For example, even when the same compression algorithm and setting are used, the compressed result of an image with large patches of uniform color would appear much better than the compressed result of another image with scattered color patterns. Thus, to be able to obtain the desired compression results, one would need to know the characteristics of the compression algorithm and settings and how different image features are impacted by the compression technique used. This is no simple task, especially given the wide array of compression algorithms available and their unique compression characteristics and settings. Thus, to properly select the appropriate compression algorithm and settings, one would need to have in-depth knowledge of the needs of the application in which the compressed image is to be used, the characteristics of each compression algorithm, the effects of each setting, the image features present in the subject image, and how the compression algorithm and settings would affect the compression results for that image.

SUMMARY OF PARTICULAR EMBODIMENTS

An augmented reality (AR) design studio, in particular embodiments, is an AR effects creation tool that may be used for compositing and adding interaction to AR elements so that the AR effects can be published into various applications. The AR design studio may comprise a variety of design features that can assist a AR designer to create interactive and sophisticated AR effects.

There are generally two phases during an AR effects design process: a creative phase during which AR effects are designed and an optimization phase during which the AR effects are optimized for deployment. The AR effects may include display rules and logic and artistic components, such as 3D models, accents, texture, or other supporting elements. The finished design of the AR effects, including the 3D models and textures, may be packaged and saved in files and sent to client devices. To minimize transmission and storage costs, it is desirable to reduce the file size of an AR effect to as small as possible with a minimum loss of quality. This may be accomplished by, for example, compressing texture images. However, as previously mentioned, the compression process is complex with a lot of compression settings to configure and consider. For a graphic designer who is not well versed in image compression, the compression optimization process can be challenging and may not yield the optimal, desired results.

Embodiments described herein relate to methods and systems for image compression optimization. The system (e.g., an AR design tool) may enable a designer to create AR effects and automatically optimize the created AR effects for compression size and quality. In particular embodiments, the designers may select a desired image quality (e.g., 50%, 70%), a desired image resolution, and/or a target file size using a user interface, and the system may automatically analyze and choose the optimal compression algorithm and/or setting for each texture of the AR effect and/or for all the device types (or operating systems) that the AR effect is deployed to. The AR effect textures may be compressed using the compression algorithm and/or setting that the system deems to be optimal (e.g., in terms of minimizing file size while maintaining the desired image quality over a threshold).

To determine the optimal compression setting for a texture, particular embodiments may compress each texture of the AR effects using a range of different compression settings. Each compressed texture may be assigned a quality score, wherein the quality score can be represented by a variety of quality measurement including a Structural SIMilarity index (SSIM) score and other quality measurement metrices. SSIM, for example, is a perceptual metric that quantifies image quality degradation caused by data compression and is computed by comparing the processed (or compressed) image with a reference image. Based on the quality (e.g., 70%) selected by the designer, a corresponding SSIM threshold (e.g., 0.92) may be selected based on a predetermined SSIM-to-Quality correlation (e.g., a mapping between the SSIM scores and qualities). In particular embodiments, the system may identify one of the SSIM scores that is the closest to and exceeding the SSIM threshold as the optimal SSIM score, and the compression algorithm and/or setting used for generating the compressed texture with that optimal SSIM score may be used for compressing the specific texture of interest. In this manner, the system may automatically determine how each texture image in an AR effect is to be compressed to achieve optimal results.

In particular embodiments, the system can automatically determine the optimal compression settings or allow the designer to manually configure the settings for particular textures of an AR effect. For those textures slated for automatic compression optimization, the system may automatically determine the optimal compression setting. In particular embodiments, automatic compression optimization can be overridden by a manual compression selection, in which case the designers can manually configure the compression setting for a desired compression result. The automatic compression optimization and the manual alternative may be selected at a project level (e.g., the compression setting may be applied to every texture used in the design project) or a texture level (e.g., compression settings for individual textures can be individually set).

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

In particular embodiments, the AR design tool is a tool for designing AR effects. The AR design tool may enable designers to composite or interact with AR elements in design time to achieve the desired effects. After the AR effects are created, the AR design tool can optimize the AR effects for the designers so that the AR effects can be deployed in different formats for different devices or operating systems. Instead of requiring AR designers to go through various compression options and select the desired ones, the AR design tool may simplify the user interface such that the designers may select only one or two options to perform the optimization process, resulting in significant time savings during the optimization process.

In particular embodiments, the AR design tool may be used by users (e.g., the AR designers) to create AR effects including details of artistic components, such as 3D models, accents, textures, or other supporting elements. Each AR effect may have one or more of its own textures. Each individual texture may have its own features and resolution, which may be quite different than others. The different features or resolutions of the textures may impact the compression results significantly with respect to the same compression setting.

In order to achieve a desired compression quality, the designers may need to manually adjust a variety of compression options in the compression settings and go through an iterative procedure, at a project level for the textures used in the entire AR effect or at a texture level for each individual texture. The users may have to manually adjust the settings, manually review the compression results, and try to guess which options to adjust and how to adjust them. Such an iterative compression procedure is very time consuming and very difficult for non-expert users to conduct, since the users may need to understand the function of each compression option and know how to adjust it to achieve the desired compression results. Even for expert users, the process could be tedious and time-consuming, especially without an objective indication of whether a compression result is optimal.

Embodiments described herein relate to methods and systems for automatically optimizing image compressions, such as for texture images used in computer graphics. In particular embodiments, the embodiments described herein may be a feature of an AR design tool. For example, AR designers may select a desired quality (e.g., 50%, 70%), and the AR design tool would automatically choose the optimal compression setting for each texture of the AR effects and for all device types to which the AR effects are deployed. The AR effect textures may be compressed using the selected optimal compression setting.

Figure 1:
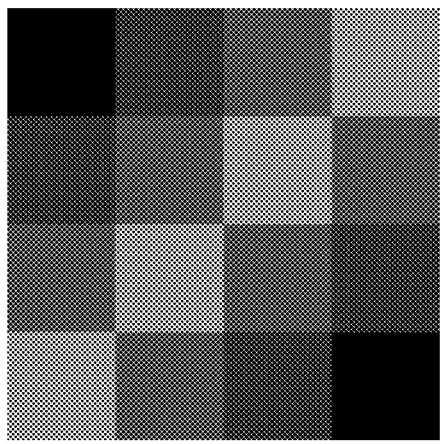
FIG. 1 illustrates example textures for compression in accordance with particular embodiments.
Figure 1:
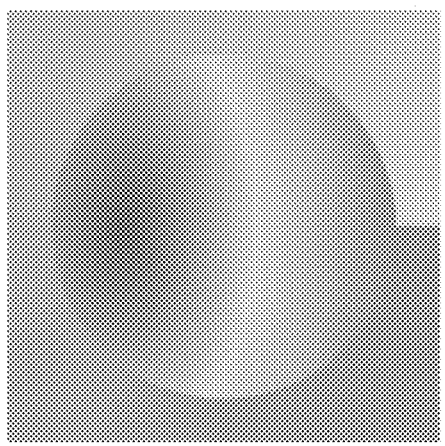
Figure 1:

FIG. 1 illustrates example textures for compression in accordance with particular embodiments. FIG. 1 shows three different kinds of textures, a texture 110, a texture 120, and a texture 130. All three textures 110, 120, and 130 may be compressed with respect to a desired quality and a target resolution. While the textures are compressed, some details of the original textures may be lost, and the quality of the compressed texture images may be degraded. The degree of the degradation may depend on various factors, including the compression algorithm used, the compression settings used, and/or the features or characteristics of the images, such as their respective color patterns and resolutions. When the texture images are compressed significantly using aggressive lossy compression techniques, the compression texture images may degrade poorly, and compression artifacts may be more noticeable, but the file size of the images may be more significantly reduced. On the other hand, when the texture images are compressed slightly using lossless or visually lossless techniques, the compressed texture images may not degrade as noticeably but the resulting file size may be significantly larger.

In addition, based on the features of the texture images, some of the textures may degrade more gracefully than others, with respect to the same compression setting. For example, because texture 110 has a lot of fine details, such as many different colors and patterns, the texture 110 may be difficult to compress with little compromise in quality. In other words, the compressed texture image of the texture 110 may degrade poorly, resulting in compression artifacts and the loss of detail. Compared to texture 110, texture 120 has fewer and more continuous colors, making it easier to compress than the texture 110. The compressed texture image of texture 120 may degrade better than that of texture 110, with fewer compression artifacts and less loss in image details. Compared to texture 110 and texture 120, texture 130 has even fewer colors (e.g., only grayscale colors) and the color patterns are grid-like, thus making texture 130 even easier to compress. The compressed texture image of the texture 130 may degrade gracefully, with minimal or no loss in quality. What these examples show is that different textures may be compressed using different compression algorithms or settings to maintain a threshold level of quality while minimizing their respective file sizes.

Figure 2:
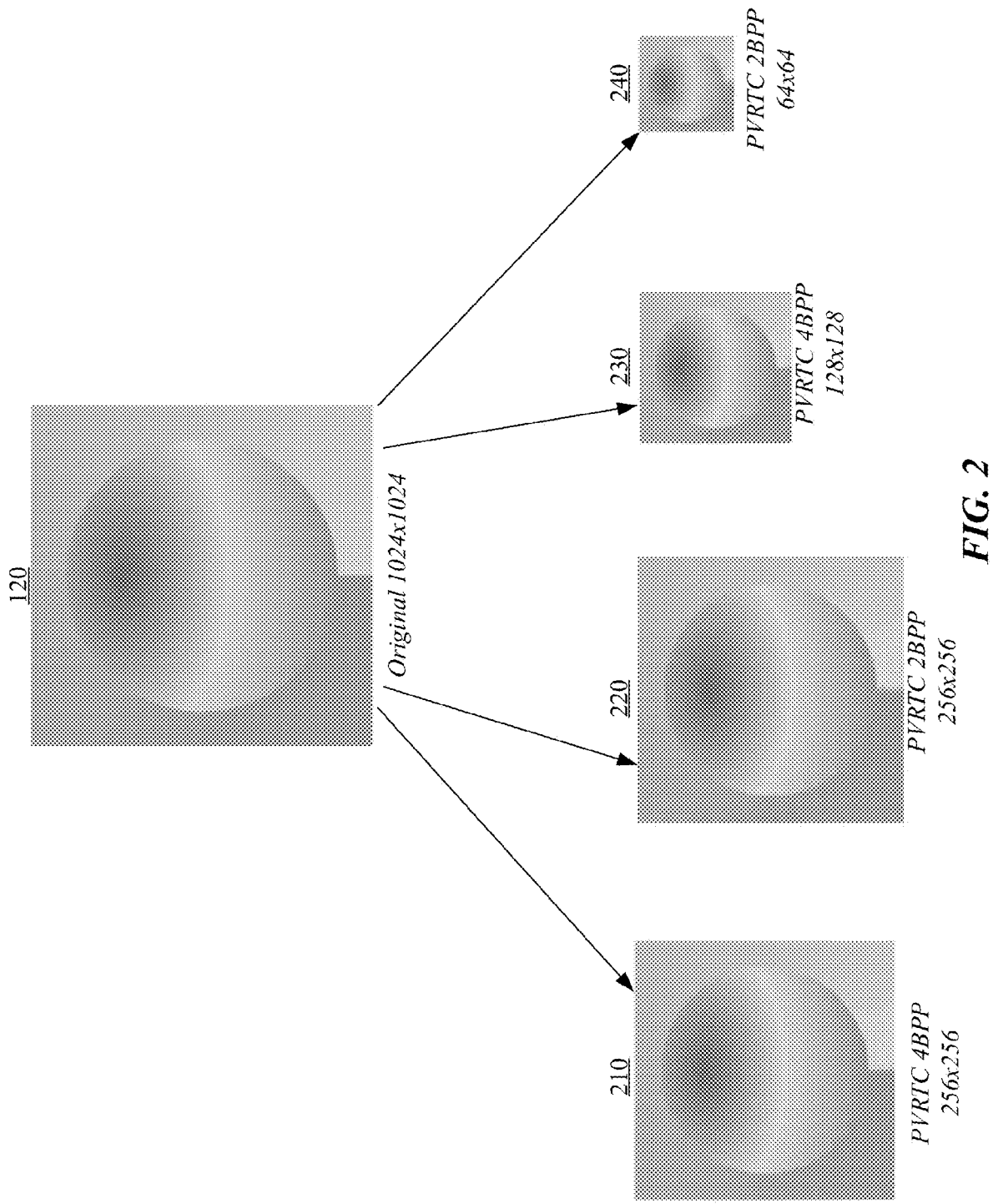
FIG. 2 illustrates an example of using different compression settings to generate different compression results (not necessarily drawn to scale), in accordance with particular embodiments.

FIG. 2 illustrates an example of using different compression settings to generate different compression results, in accordance with particular embodiments. In particular embodiments, an AR design tool may provide an automatic compression option for automatically optimizing the AR effects by selecting the optimal compression setting for compressing a particular texture to preserve image quality and minimize file size. The automatic compression feature may improve the workflow of designing AR effects significantly, as the designers may be able to concentrate on the creative phase of the AR effects design and save a lot of effort and time on the optimization phase. In particular embodiments, the optimization phase may be automatically performed based on only one or two user inputs from the designer. The system (e.g., the AR design tool) may accomplish the optimization automatically at a project level for an AR effect or at a texture level for each individual texture used by the AR effect. The completed AR effects, including textures, can be deployed to different devices (e.g., mobile phones, tablets, or PCs) and on the different system platforms (e.g., iOS or ANDROID).

In particular embodiments, the system may compress each texture with different predetermined compression settings (e.g., fast compression settings), evaluate the compression results, and select the optimal setting for compressing the texture. For example, as shown in FIG. 2, the texture 120 of FIG. 1 may be processed by an assessment model, wherein the texture 120 may be compressed with multiple fast compression settings (e.g., four different fast compression settings are shown as non-limiting examples.) The multiple fast compression settings may comprise any number of compression settings, such as all power-of-two square resolutions (e.g., $2^4 \times 2^4$, $2^6 \times 2^6$, $2^9 \times 2^9$, $2^{12} \times 2^{12}$, etc.) or any subset thereof, up to the original resolution of the texture 120 (e.g., 1024×1024 and under), wherein each resolution is compressed using each compression format of interest (e.g., PVRTC_2BPP and PVRTC_4BPP formats may both be used to generate two 1024×1024 compressed images). Each of the fast compression settings may be predetermined with a particular combination of compression options. In one example, the texture 120 has the original resolution of 1024×1024, and may be compressed with a first setting of PVRTC_4BPP 256×256, a second setting of PVRTC_2BPP 256×256, a third setting of PVRTC_4BPP 128×128, and a fourth setting of PVRTC_2BPP 64×64. However, in another example the compression settings may further include, e.g., PVRTC_4BPP 512×512, PVRTC_2BPP 512×512, PVRTC_2BPP 128×128, PVRTC_4BPP 64×64, or any other desired setting. PowerVR Texture Compression (PVRTC) is a compressed texture format used in all generations of the IPHONE, IPOD ITOUCH, and IPAD. It is also supported in certain ANDROID devices that use PowerVR graphic processing units (GPUs). PVRTC can have various formats such as 4-bit per pixel (4BPP) format and 2-bit per pixel (2BPP) format. In addition to the different compression formats, different resolutions may be included in the compression options for scaling the texture, such as the 256×256 in the first setting and the second setting, 128×128 in the third setting, and 64×64 in the fourth setting. Each compressed texture may be further scaled up or down with respect to the specific resolution in the compress setting.

During an AR design flow, the quality of different compression settings for each texture 120 may be assessed by compressing it under a range of different settings (e.g., the four fast compression settings described previously or any number and type of compression settings). Particular embodiments may perform the compressions using fast compression, since the results are used for assessment purposes and may not necessarily be used as the final output. Alternatively, the system may provide an option to use normal compression to obtain more accurate assessment metrics (e.g., SSIM scores), but the assessment process may take longer to complete. To cover a wide range of qualities and compression cost, given an image format, the assessment module may conduct the compressions using a range of settings that are of interest. For example, the compression settings may comprise multiple options (e.g., 3, 5, 12, 16, etc.) which may include a resolution, a file size, an alpha channel, compression formats, and/or accuracy. For each of the fast compression settings, a predetermined combination of the compression options is set and used for compressing the texture 120. For example, compressed textures 210, 220, 230 and 240 may be generated by compressing the texture 120 using the first, second, third, and fourth compression settings, respectively. The compressed textures 210 may be generated with the first setting, wherein the texture 120 is compressed by the compression format PVRTC_4BPP and scaled to the resolution of 256×256. The compressed textures 220 may be created with the second setting, wherein the texture 120 is compressed by the compression format PVRTC_2BPP and scaled to the resolution of 256×256. The compressed textures 230 may be created with the third setting, wherein the texture 120 is compressed by the compression format PVRTC_4BPP and scaled to the resolution of 128×128. The compressed textures 240 may be created with the forth setting, wherein the texture 120 is compressed by the compression format PVRTC_2BPP and scaled to the resolution of 64×64.

In particular embodiment, each compression setting may support multiple formats for different device types or operating systems. Since a given compressed image may appear differently on different devices or operating system (e.g., due to variations in display technology, image decoding processes, etc.), particular embodiments may generate compressed images for different devices or operating systems for assessment purposes. For each of the device types, options of different compression formats, resolution, and accuracy levels can be selected automatically as appropriate by the system. As an example, the accuracy levels may be set to maximum for PVRTC and ETC2 formats, such as PVRTC_V1_4_RGB 512×512 for IPHONE, ETC2_RGB 256×256 for ANDROID, and JPEG 512×512 with the highest accuracy for older ANDROID.

Scaling may be desirable in embodiments where the designer is given the option to specify a desired target resolution (e.g., 128×128, 256×256, maximum resolution of the original image, etc.). For example, if the designer knows that the AR effect is only going to be used on a mobile device with a small screen, the designer may indicate that a relatively small target resolution (e.g., 128×128). On the other hand, if the designer intends for the AR effect to support tablets as well, the target resolution may be much larger (e.g., 512×512). Based on this input, the system may perform its quality evaluation at the desired target resolution. To do so, the system, in particular embodiments, may scale each compressed image to the target resolution and compare it with a similarly scaled version of the original image.

Figure 3:
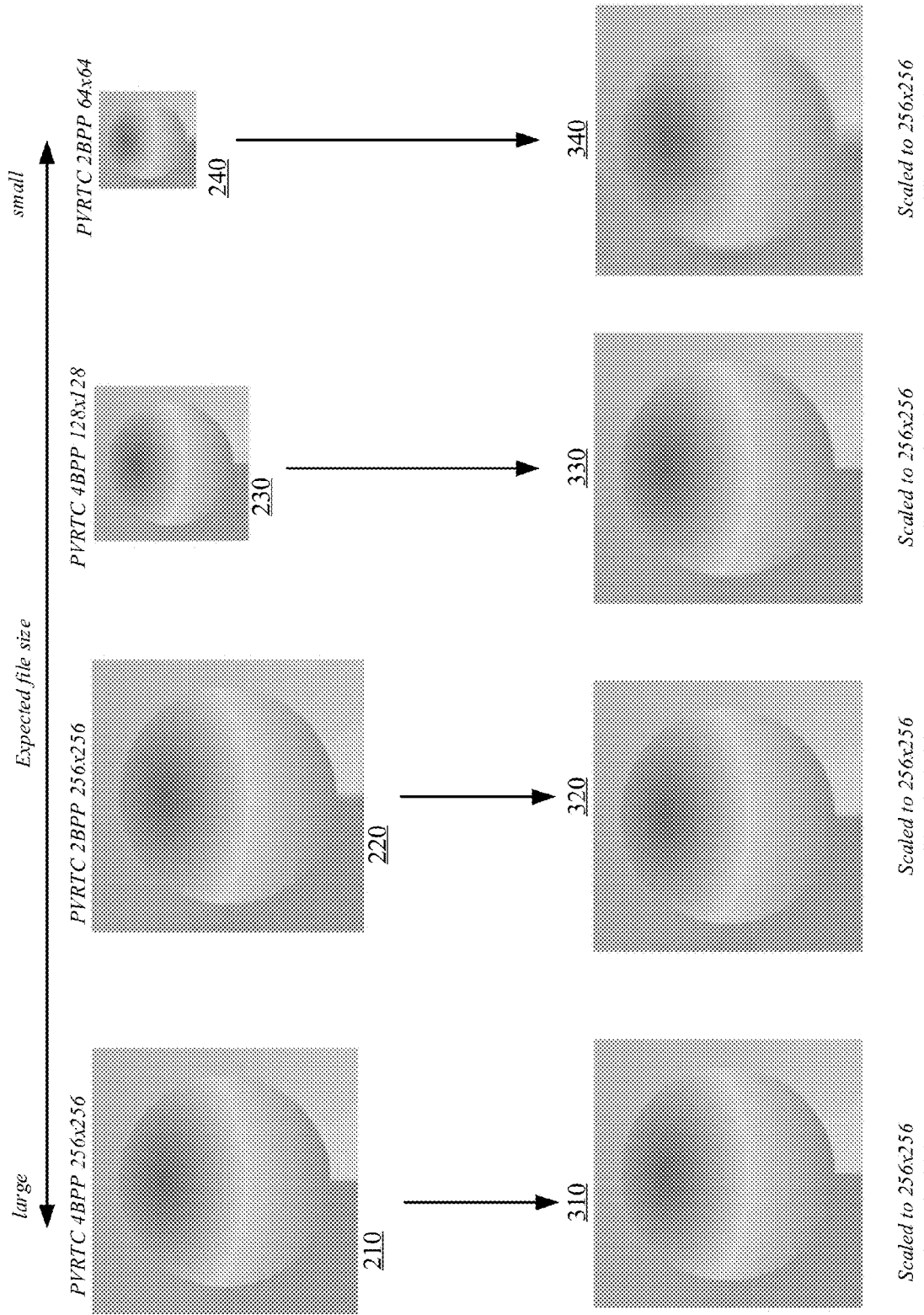
FIG. 3 illustrates an example of scaling the compression results (not necessarily drawn to scale) and assigning them SSIM scores, in accordance with particular embodiments.

FIG. 3 illustrates an example of scaling the compression results and assigning them SSIM scores, in accordance with particular embodiments. In particular embodiments, each of the compression textures 210, 220, 230, and 240 may be compared with the original texture 120 to calculate respective quality metric, such as a Structural SIMilarity (SSIM) score. The SSIM scores may range from 0-1 (0.91, etc.), wherein a higher SSIM represents a higher quality of compression. For the range of different fast compression settings discussed previously, a corresponding group of SSIM scores may be calculated. Before the SSIM scores are calculated, the compressed textures and the original texture may be scaled to the same resolution for comparison, wherein the resolution may be a target resolution specified by the designer or a default resolution (which may be selected based on the device or operating system on which the texture is intended to be displayed).

In the example shown in FIG. 3, the compressed textures 210, 220, 230 and 240 may first be scaled to a target resolution of 256×256, which may be specified by the designer via a user interface. The compressed textures 210, 220, 230, and 240 may correspond to the scaled compressed textures 310, 320, 330, and 340, respectively. For the compressed textures 210 and 220, since the target resolution is the same as the resolutions used in the compression settings, the compressed textures are not scaled up or down. For the compressed textures 230 and 240, since the target resolution (e.g., 256×256) is higher than the resolutions used in the compression settings (e.g., 128×128 or 64×64), the compressed textures are scaled up. For purposes of comparison, the original texture 120 having a resolution of 1024×1024 may also be scaled down to the target resolution of 256×256.

Once all the textures are scaled to the same resolution, the system may perform the comparison by an evaluation module. Each of the scaled compressed textures 310, 320, 330, and 340 may be compared with the scaled original texture. For example, the scaled original texture may be compared with the scaled compressed texture 310, and the system may calculate a SSIM score of 0.98162 accordingly. The scaled original texture may similarly be compared with the scaled compressed textures 320, 330, and 340, resulting in SSIM scores of 0.931213, 0.82615, and 0.67534, respectively. As shown in the FIG. 3, the scaled compressed texture 310 has the highest SSIM score and is most similar to the scaled original texture, while the scaled compressed texture 340 with the lowest SSIM score has visible compression and scaling artifacts. The corresponding SSIM score of the scaled compressed texture 310 is the highest and the corresponding SSIM score of the scaled compressed texture 340 is the lowest, which reflects the differences in image quality generally.

Figure 4:
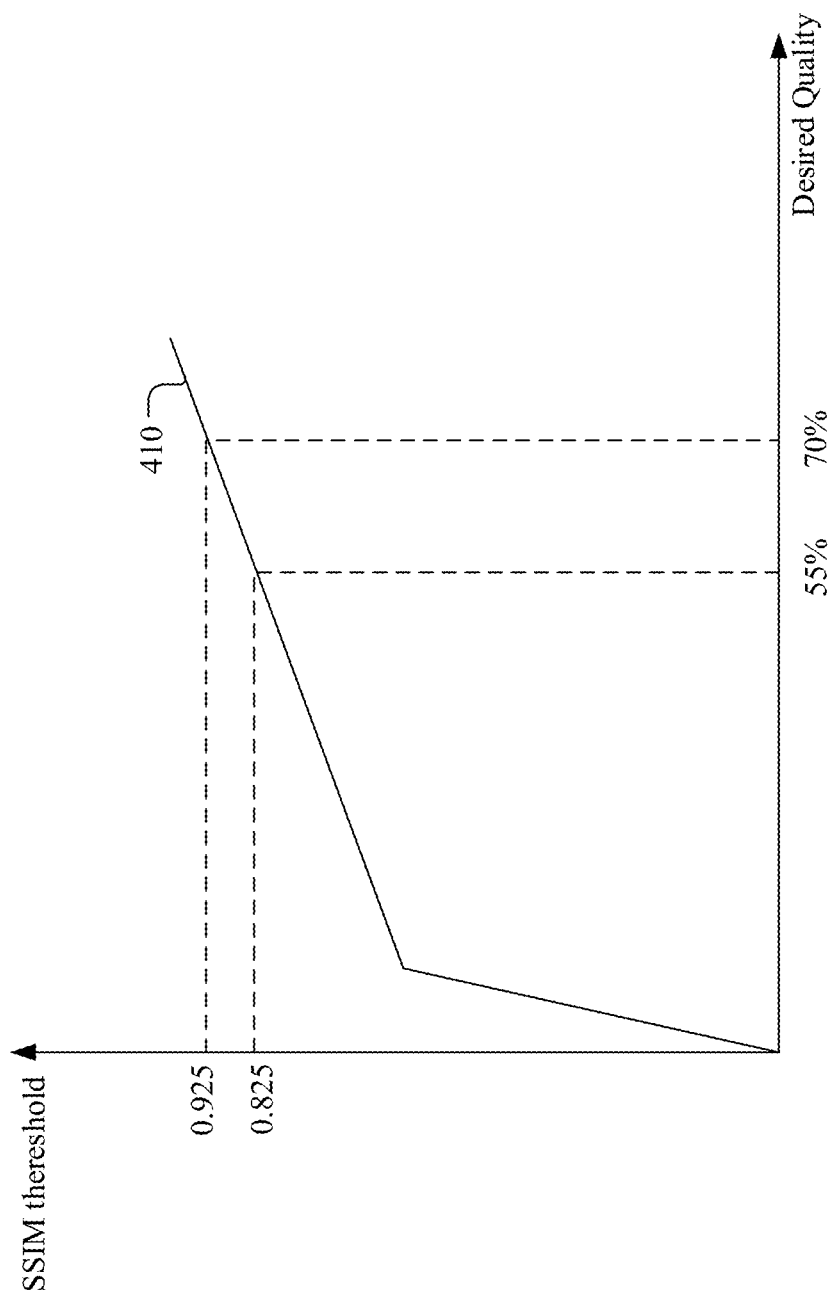
FIG. 4 illustrates an example SSIM-to-Quality correlation chart, in accordance with particular embodiments.

FIG. 4 illustrates an example SSIM-to-Quality correlation in accordance with particular embodiments. A predetermined correlation of SSIM scores and user qualities may be predetermined and stored by the system, where each of the SSIM scores is mapped to a corresponding user quality number. In particular embodiments, as shown in the FIG. 4, a user quality coordinate can range from 0 to 100%, and a SSIM threshold coordinate may range from 0 to 1. Each of the user qualities can have a corresponding SSIM score, and the corresponding SSIM scores can be formalized and represented as a SSIM plot 410. The SSIM scores and user qualities correlation may be determined and represented in various ways including a matrix, a lookup table, or the SSIM plot 410 shown in FIG. 4.

In particular embodiments, given a desired quality (e.g., 70% selected by the designer), a corresponding SSIM score (e.g., 0.925) can be determined, as represented by the SSIM plot 410. When the users change the quality selection on the user interface, the system may locate the corresponding SSIM score based on the SSIM-to-Quality correlation (e.g., the SSIM plot 410). The located SSIM score may be used as a SSIM threshold with respect to the specified user quality for selecting the optimal compression settings, such that only the compression settings whose corresponding SSIM scores exceed the SSIM threshold can achieve the desired compression quality. For example, when the user quality is specified as 70%, the SSIM threshold can be determined as 0.925 based on the SSIM plot 410. Any compression setting whose corresponding SSIM score is higher than the 0.925 may be eligible for compressing the texture to meet the 70% user quality requirement. In particular embodiments, when there are more than one SSIM scores higher than the SSIM threshold, the compression setting associated with the smallest estimated or expected file size may be selected. The selected compression setting may be used as the optimal compression setting for compressing the particular texture.

In embodiments where fast compression results are used to assess compression quality of different compression settings, the compression settings may be ordered or ranked based on the expected file sizes of their respective results. For example, a list of compression settings ordered by their expected file sizes from large to small may be: e.g., PVRTC_1_4_RGB 256×256, PVRTC_1_2_RGB 256×256, PVRTC_1_4_RGB 128×128, PVRTC_1_2_RGB 128×128, PVRTC_1_4_RGB 64×64, PVRTC_1_2_RGB 64×64. Based on this ordered list of compression settings, the system may select the compression setting with the smallest expected size that satisfies the desired quality level (e.g., SSIM threshold). As an example, the system may build a list of compression settings ordered by expected file size (e.g., based on empirical studies, experience, or historical data of those compression settings) from small to large as shown in FIG. 3, wherein the expected file size associated with settings of PVRTC_4BPP 256×256 is the largest and the expected file size associated with the setting of PVRTC_2BPP 64×64 is the smallest. By searching the SSIM scores corresponding to the range of fast compression settings as shown in FIG. 3, the system would determine that the first and second settings for the scaled compressed textures 310 and 320 have SSIM scores (e.g., 0.98162 and 0.931213) exceeding the SSIM threshold of 0.925. Between the compression settings used to generate compressed textures 310 and 320, the system may select the one with the smaller expected file size, which in this example would be the PVRTC_2BPP 256×256 setting, as the optimal compression setting. Through this process, the system may automatically determine the optimal compression setting (e.g., the compression setting that is expected to generate the smallest file size while meeting the threshold SSIM requirement) for the particular texture with respect to the user quality that the designer desires.

As anther example, the system may build a list of compression settings in order of expected file size from small to large for old Android type, wherein the list may comprise settings of JPEG 64×64, JPEG 128×128, JPEG 256×256, and JPEG 512×512 in the order of expected file size from small to large, and the corresponding SSIM scores associated with the settings may be calculated as 0.6789, 0.8765, 0.9612, and 0.9602, respectively. This example illustrates that the relative expected file sizes may not necessarily correspond to the relative SSIM scores, as shown by the SSIM score of JPEG 256×256 being higher than that of JPEG 512×512. By searching the SSIM scores corresponding to the range of the JPEG settings, the system would determine that the settings of JPEG 256×256 and JPEG 512×512 have SSIM scores (e.g., 0.9612 and 0.9602) exceeding the SSIM threshold of 0.925. Between JPEG 256×256 and JPEG 512×512, the system may select the one with the smaller expected file size (e.g., the expected file size of the JPEG 256×256) as the optimal compression setting.

As the user's quality selection changes, the corresponding SSIM threshold may be different. For example, when the user quality is specified as 55%, the corresponding SSIM threshold may be 0.825. Based on the example shown in FIG. 3, three SSIM scores, 0.82615, 0.931213 and 0.98162, exceed the SSIM threshold of 0.825. Following the same principle discussed above, the system may identify the compression setting for the scaled compressed texture 330 as the optimal compression setting because it has the smallest expected file size of the three settings that generated results satisfying the SSIM threshold of 0.825. Once the optimal compression setting is determined by the system, the original texture 120 may be re-compressed with the optimal compression setting. For example, the original texture 120 may be re-compressed with the third compression setting (PVRTC_4BPP 128×128) to create a final AR texture that is optimized with respect to the user quality and resolution selections. The final optimized AR textures may be saved to a file, and the file may be deployed to the devices where the textures may be rendered on the 3D models of the AR effects. In particular embodiments where the AR effects are to be deployed on multiple types of devices or operating systems, an optimal compression setting may be determined using the process described above for each device or operating system. Then for each device or operating system of interest, the AR effects may be compressed using the corresponding selected optimal compression settings.

The compression feature described herein may be integrated with an AR design tool. In particular embodiments, through a user interface, the users may specify a desired compression quality on the user interface (UI). When the compression feature is selected from the menu on the user interface, the system may start the automatic optimization process for the textures used in the designer's AR project. In particular embodiments, an estimated project size for each device type may be displayed on the user interface based on the current compression settings that have been selected based on the user-specified compression quality and/or resolution. Such information allows the users to foresee whether the compression can successfully meet a target file size. If the users realize that the compression may not be able to meet the target file size (e.g., the estimated project size if larger than the target file size), the users may try a lower quality and/or resolution and repeat the process to obtain an updated project-size estimate. The estimation of the project size can prevent the users from wasting time waiting for a complete optimization process, just to find out the file size is unacceptable. For example, the users need a target project size of under 2 MB. The system may provide a file size estimation of 1.9 MB for iOS type, 1.8 MB for ANDROID, or 1.7 for old ANDROID. Thus, the users are confident that the optimization process will successfully meet the target project size of 2 MB for each platform. If the file size estimation exceeds the target size of 2 MB, the users may need to re-adjust options including the quality selection (e.g., lower the quality) or the resolution (e.g., smaller resolution) to meet the target file size. Once the user has re-adjusted the quality or the resolution, the user may request a new estimation on the user interface, until the estimated file size is under the target file size. In particular embodiments, the user interface may provide a warning (e.g., a pop out window) that the estimated file size is exceeding the target file size.

In particular embodiments, the user interface may provide the users with options to visually inspect/evaluate the optimization results by toggling between the displays of AR effect with the original textures and the compressed textures. A toggling button may be provided on the user interface, and when pressed, the displays of AR effect with the texture and the corresponding compressed texture may be toggled back and forth for the users to visually inspect/evaluate whether the compressed texture is satisfactory. In particular embodiments, the displays of AR effect with the compressed textures of different compression settings may be toggled for inspection. In other particular embodiments, the system may toggle between a simulation of an AR effect using the original textures and a simulation of the AR effect using the compressed textures.

In particular embodiments, a target resolution of the compressed texture may be specified by the designer. The target resolution may be smaller or the same as the original texture resolution. For example, if the original texture 120 has a resolution of 1024×1024, the target resolution may be set as 1024×1024 or lower, such as 256×256. For instance, if the target resolution is set as the resolution of the original texture, the fast-compressed textures may be scaled to the resolution of the original texture before being compared with the original texture to calculate the SSIM score. In particular embodiments, if the resolution of the original texture is not a power-of-two square (e.g., it is not 2″×2″), the original texture may be scaled up to the next power-of-two square and use that resolution as the basis for comparison. This may be particularly useful for compression formats such as PVRTC. In certain embodiments, the user may set a constraint on the resolution, in which case the original texture may be scaled down to the desired resolution for comparison purposes. For example, the user may set the desired size constraint to be 128×128, even though the resolution of the original texture may be 1024×1024. In this case, after fast-compression textures have been generated, the fast-compression textures and the original texture may each be scaled down to 128×128. The scaled-down fast-compression textures may each be compared with the scaled-down original texture to determine their respective quality scores (e.g., SSIM).

Figure 5:
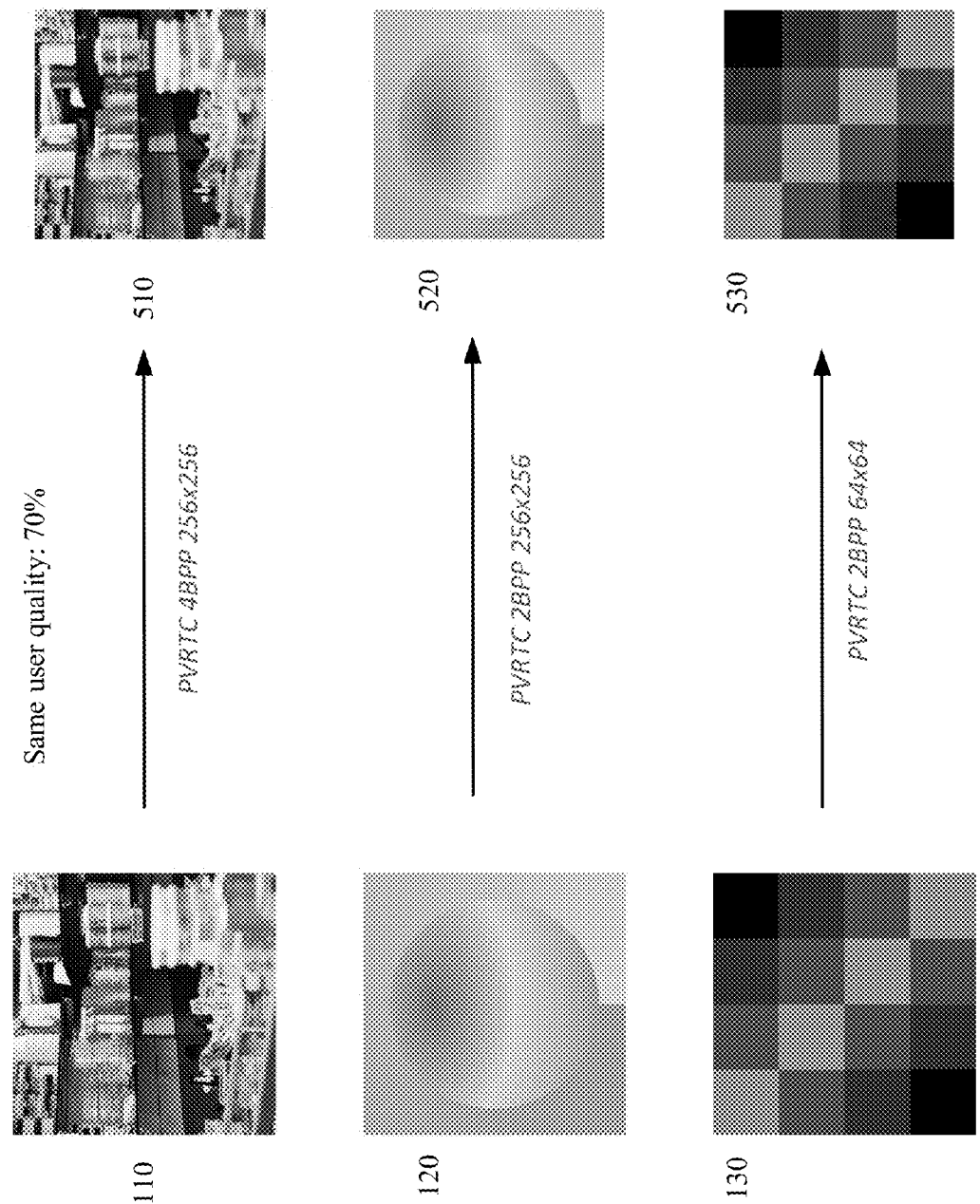
FIG. 5 illustrates examples of compression results (not necessarily drawn to scale) generated using optimal compression settings selected in accordance with particular embodiments.

FIG. 5 illustrates an example optimization of multiple textures in accordance with particular embodiments. An individual AR effect may have multiple textures. The system may automatically select the optimal compression setting for each texture with respect to characteristic of the individual texture. As described with reference to FIG. 1, characteristic of the individual texture may significantly impact the optimization quality, resulting in different images degrading differently even when using the same compression setting. For example, a more complex texture (e.g., texture 110) with more complex color patterns may be difficult to compress and needs to be compressed with a more lossless compression setting to achieve the desired quality, while the same level of quality may be achieved for a blocky texture (e.g., texture 130) even when a more lossy compression setting is used.

In particular embodiments, different textures in the same AR project may be compressed using different compression settings that are determined based on the designer's quality selection. For example, following the same principle described previously, the system may determine that PVRTC_4BPP 256×256 is the optimal setting for optimizing texture 110, PVRTC_2BPP 256×256 is the optimal setting for optimizing texture 120, and PVRTC_2BPP 64×64 is the optimal setting for texture 130, with respect to the same threshold quality of 70% selected by the designer. Thus, the project file including all three AR textures may be reduced while maintaining the desired quality of the textures.

For example, using the automatic compression feature described herein, textures 110, 120, and 130 may be compressed by the range of different fast compression settings discussed previously. Each of the textures 110, 120, and 130 may be assessed by the range of fast compression settings, and a corresponding group of the fast compression textures may be created. As the users select the user quality of 70%, the system may determine that the corresponding SSIM threshold is 0.925. For each of the textures 110, 120, and 130, the system may determine which compression setting with the smallest expected file size would generate a fast-compression result that satisfies the 0.925 SSIM threshold and select it as the optimal compression setting. Thus, for texture 110, if only the compressed image generated using PVRTC_4BPP 256×256 has a SSIM score higher than the threshold of 0.925, the corresponding fast compression setting of PVRTC_4BPP 256×256 may be selected as the optimal compression setting. The original texture 110 may be compressed with the setting of PVRTC_4BPP 256×256 to generate the compressed texture 510. For texture 120, if both settings of PVRTC_4BPP 256×256 and PVRTC_2BPP 256× 256 generated fast-compressed images with SSIM scores above the threshold, the system may select the one associated with the smaller expected file size, namely PVRTC_2BPP 256×256 in this example, as the optimal compression setting. The original texture 120 may be compressed with the setting of PVRTC_2BPP 256×256 to generate the compressed texture 520. For texture 130, if all four settings generated fast-compressed images with SSIM scores above the threshold, the system may select the compression setting associated with the smallest expected file size, namely PVRTC_2BPP 64×64 in this example, as the optimal compression setting. The original texture 130 may be compressed with the setting of PVRTC_2BPP 64×64 to generate the compressed texture 530. The compressed textures 510, 520 and 530 may achieve the user desired quality of 70% in operation. In this scenario, within the same AR project, the system operating under the automatic compression option may select an optimal compression setting for each texture based on the image characteristics thereof. The individual textures may be compressed by their respective optimal compression settings to achieve optimal results with respect to file-size reduction while maintaining the desired image quality.

In particular embodiments, automatic compression for particular textures within a project may be overridden by a manual compression alternative. The designers can manually configure the compression setting for each individual texture by adjusting the compression settings to achieve a particular result. Since the AR effects and the textures thereof may be deployed to different devices, the textures may be optimized with different compression formats for supporting different device types. For example, to support the IPHONE, the compression settings may comprise multiple compression formats including PVRTC_V1, PVRTC_V1_2_RGB, PVRTC_V1_2_RGBA, PVRTC_V1_4_RGB, and PVRTC_V1_4_RGBA, etc., which can be configured manually. The manual compression formats may also include a dithering level of highest, medium, and lowest, and an accuracy level of highest, medium, and lowest. The file sizes of the compressed texture for different device types may be different. For example, with the same user quality selection and the target resolution, the file size of the compressed texture may be 550 KB for IPHONE, 600 KB for ANDROID (ETC), or 650 KB for older ANDROID.

However, the manual compression process is complex with a lot of compression options to configure. For a graphic designer who is not well versed in image compression, the manual compression process is time consuming and tedious, often requiring many iterations of tweaking. Typically, the manual compression option may be selected at a project level or at a texture level for one or more particular textures.

Figure 6A:
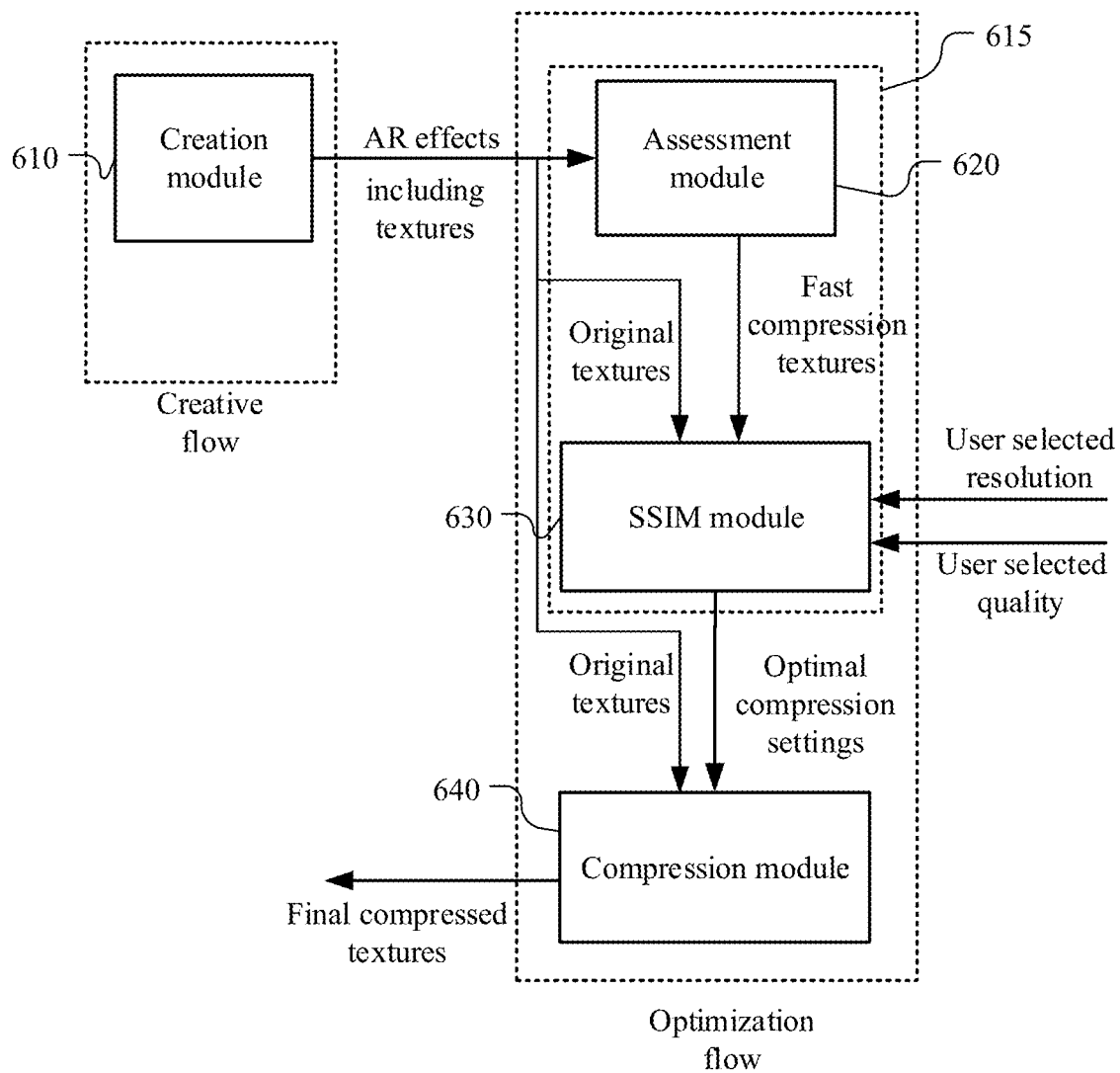
FIG. 6A illustrates an example top level diagram of AR Design Studio in accordance with particular embodiments.

FIG. 6A illustrates an example top level diagram of the AR design tool in accordance with particular embodiments. The top-level diagram 600 may comprise a creation module 610, an optimization module 615 including an assessment module 620 and a SSIM module 630, and a compression module 640. The entire AR design flow may include a creative flow and an optimization flow. The creative flow may include the creation module 610 for creating the AR effects. The creation module 610 may include user interfaces, artistic-design tools, and logic-design tools for creating AR effects comprising display rules and logic and artistic components, such as 3D models, accents, texture, or different support elements. The created AR effects and the textures thereof may be saved. When the designer is ready to export the AR effects, the AR effects may be optimized through the optimization flow.

The optimization flow may start with the designer specifying a desired resolution and a desired image quality and, based on such inputs, the system may determine the optimal compression settings for the textures in the AR effects. In particular embodiments, the images of the AR textures may be assessed using the assessment module 620, which is configured to compress each texture using a range of fast compression settings. The fast compression settings may be predetermined or user-selected, and they may cover a wide range of compression options including compression algorithms, settings, and resolutions designated for speedy compressions. For each texture, a group of fast-compressed textures may be generated using the range of fast compression settings. The groups of fast-compressed textures may be sent to the SSIM module 630 for further processing.

In particular embodiments, the SSIM module 630 may assess the image quality (e.g., as measured using SSIM or any other suitable image-quality metric) of each fast-compressed texture. In particular embodiments, the groups of fast-compressed textures may be scaled with respect to the received user resolution selection, and the corresponding original textures may also be scaled to the same resolution by the SSIM module 630. Once the fast-compressed textures and the original textures are scaled to the same resolution, a comparison of the scaled fast-compressed textures and the scaled original textures can be performed, and corresponding SSIM scores may be calculated to represent the comparison results. Meanwhile, a SSIM threshold can be determined based on the input of the desired quality. The SSIM threshold may be selected based on a predetermined SSIM-to-quality correlation. The determined SSIM threshold can be used to select an optimal compression setting for a particular texture. As discussed previously, the group of fast-compressed textures associated with a particular original texture may each be assigned an SSIM score. The optimal compression setting for that particular original texture may be the compression setting that has the smallest expected file size among the settings that generated fast-compressed textures with at least the threshold SSIM score. In particular embodiments, different compression settings may be determined for different textures based on the characteristics thereof. In other particular embodiments, each texture may be optimized with different device formats or different device types. In other particular embodiments, manually configured compression settings specified by the designers may be used as the optimal compression settings.

The compression module 640 may generate the final compressed textures using the optimal compression settings received from the SSIM module 630. The unscaled, uncompressed original textures from the creation module 610 may be compressed using the optimal compression settings selected by the SSIM module 630. The final compressed textures may be provided to the designers for inspection or evaluation on the user interface, and an estimated file size of a file containing one or more final compressing textures may be displayed. In particular embodiments, the designers may perform other operations on the user interface, such as further scaling down the final compressed textures to a final resolution, toggling between the displays of AR effect with the uncompressed images and the compressed images for visual evaluation, or manually adjusting the compression options at the project level or texture level and repeating the optimization flow when the estimated file sizes exceed the target file size.

Figure 6B:
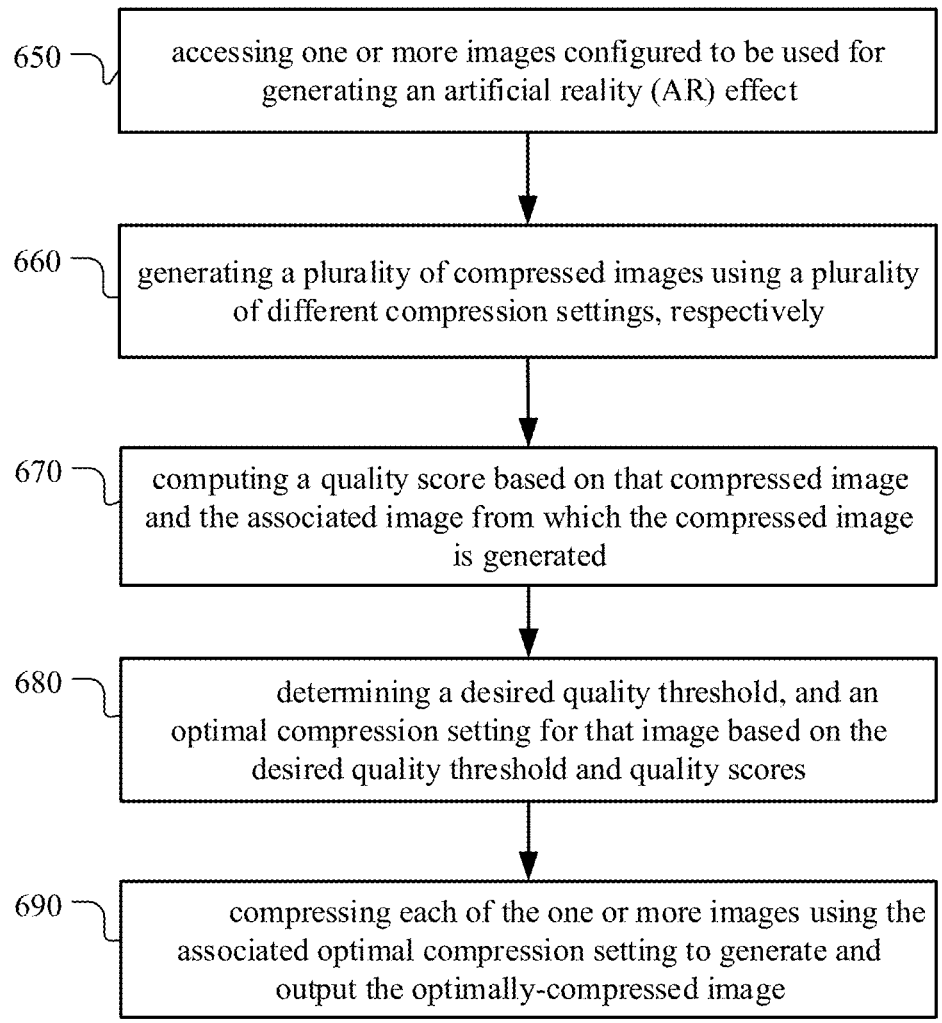
FIG. 6B illustrates an example method for AR effects creation in accordance with particular embodiments.

FIG. 6B illustrates an example method for AR effects creation in accordance with particular embodiments. The method may begin at step 650, where images of Augmented Reality (AR) effects are created, and each of the created AR effects comprises a 3D model and artistic elements including one or more textures, wherein the one or more textures may have different characteristics. At step 660, each of the one or more textures may be assessed by compressing each texture using a set of predetermined fast compression settings, wherein each of the fast compression setting is a predetermined combination of compression options for a speedy compression. A set of fast-compressed textures for each of the one or more textures may be generated, wherein each of the fast-compressed textures corresponds to one of the predetermined fast compression settings.

At step 670, an optimal compression setting is determined with respect to a received optimization quality for the one or more textures from the user. The set of fast-compressed textures for each of the one or more textures is scaled with respect to a target resolution specified by the user, and each of the original one or more textures is scaled, if needed, with respect to the same target resolution as well. A set of comparison results is generated by comparing each scaled original texture with the corresponding set of scaled fast-compressed textures, and a set of SSIM scores is calculated with respect to the set of comparison results for each of the one or more textures, wherein each SSIM score ranges between 0 to 1. A SSIM threshold may be located with respect to the received optimization quality based on a predetermined SSIM-Quality correlation. The optimal compression setting may be set as the compression setting that has the smallest expected file size among the compression settings that generated fast-compressed textures with at least the threshold SSIM score.

At step 680, final compressed textures may be generated by re-compressing the one or more original textures using the respective optimal compression setting, wherein different textures may be compressed with different optimal compression settings with respect to the same user quality and resolution specified by the user. At step 690, the compressed textures may be delivered to the user, wherein each of the compressed textures can be rendered on the respective 3D model of a corresponding AR effect to be deployed to a user device for display to the user.

Particular embodiments may repeat one or more steps of the method of FIG. 6B, where appropriate. Although this disclosure describes and illustrates particular steps of the method of FIG. 6B as occurring in a particular order, this disclosure contemplates any suitable steps of the method of FIG. 6B occurring in any suitable order. Moreover, although this disclosure describes and illustrates an example method for AR effects creation including the particular steps of the method of FIG. 6B, this disclosure contemplates any suitable method for AR effects creation including any suitable steps, which may include all, some, or none of the steps of the method of FIG. 6B, where appropriate. Furthermore, although this disclosure describes and illustrates particular components, devices, or systems carrying out particular steps of the method of FIG. 6B, this disclosure contemplates any suitable combination of any suitable components, devices, or systems carrying out any suitable steps of the method of FIG. 6B.

Figure 7:
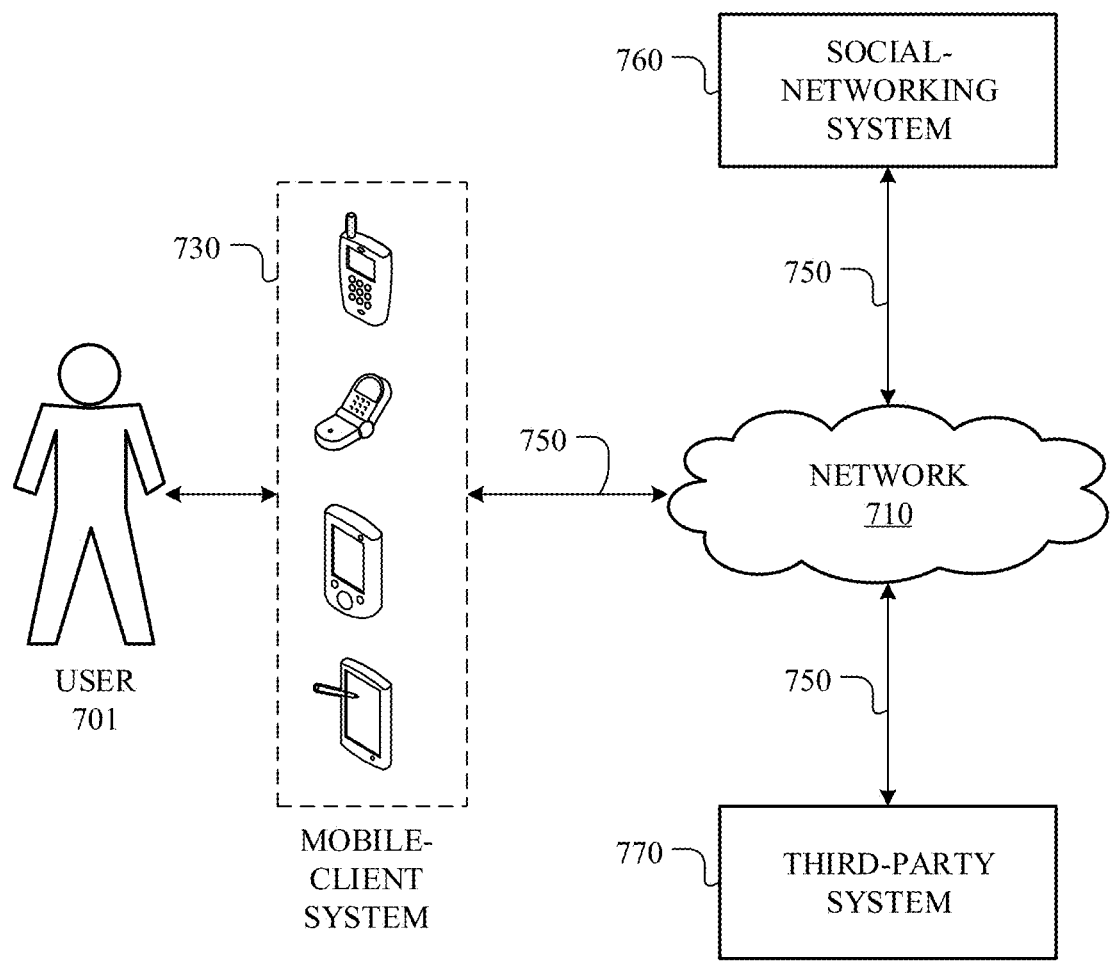
FIG. 7 illustrates an example network environment associated with a social-networking system.

FIG. 7 illustrates an example network environment 700 associated with a social-networking system. Network environment 700 includes a user 701, a client system 730, a social-networking system 760, and a third-party system 770 connected to each other by a network 710. Although FIG. 7 illustrates a particular arrangement of users 701, client system 730, social-networking system 760, third-party system 770, and network 710, this disclosure contemplates any suitable arrangement of users 701, client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of users 701, client systems 730, social-networking systems 760, third-party systems 770, and networks 710, this disclosure contemplates any suitable number of users 701, client systems 730, social-networking systems 760, third-party systems 770, and networks 710. As an example and not by way of limitation, network environment 700 may include multiple users 701, client system 730, social-networking systems 760, third-party systems 770, and networks 710.

In particular embodiments, users 701 may be an individual (human user), an entity (e.g., an enterprise, business, or third-party application), or a group (e.g., of individuals or entities) that interacts or communicates with or over social-networking system 760. In particular embodiments, social-networking system 760 may be a network-addressable computing system hosting an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. In particular embodiments, social-networking system 760 may include an authorization server (or other suitable component(s)) that allows users 701 to opt in to or opt out of having their actions logged by social-networking system 760 or shared with other systems (e.g., third-party systems 770), for example, by setting appropriate privacy settings. A privacy setting of a user may determine what information associated with the users may be logged, how information associated with the users may be logged, when information associated with the users may be logged, who may log information associated with the user, whom information associated with the users may be shared with, and for what purposes information associated with the users may be logged or shared. Authorization servers may be used to enforce one or more privacy settings of the users of social-networking system 30 through blocking, data hashing, anonymization, or other suitable techniques as appropriate. In particular embodiments, third-party system 770 may be a network-addressable computing system that can host AR design tool. Third-party system 770 may generate, store, receive, and send AR effects files, such as, for example, the AR effects including 3D models, accents, texture, or different support elements. Third-party system 770 may be accessed by the other components of network environment 700 either directly or via network 710. In particular embodiments, one or more users 701 may use one or more client systems 730 to access, send data to, and receive data from social-networking system 760 or third-party system 770. Client system 730 may access social-networking system 760 or third-party system 770 directly, via network 710, or via a third-party system. As an example and not by way of limitation, client system 730 may access third-party system 770 via social-networking system 760. Client system 730 may be any suitable computing device, such as, for example, a personal computer, a laptop computer, a cellular telephone, a smartphone, a tablet computer, or an augmented/virtual reality device.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node #04 corresponding to a particular photo may have a privacy setting specifying that the photo may only be accessed by users tagged in the photo and their friends. In particular embodiments, privacy settings may allow users to opt in or opt out of having their actions logged by social-networking system 760 or shared with other systems (e.g., third-party system 770). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), users groups (e.g., the gaming club, my family), users networks (e.g., employees of particular employers, students or alumni of particular university), all users ("public"), no users ("private"), users of third-party systems 770, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 760 may send a request to the data store for the object. The request may identify the users associated with the request and may only be sent to the users (or a client system 730 of the user) if the authorization server determines that the users is authorized to access the object based on the privacy settings associated with the object. If the requesting users is not authorized to access the object, the authorization server may prevent the requested object from being retrieved from the data store or may prevent the requested object from being sent to the user. In the search query context, an object may only be generated as a search result if the querying users is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 8:
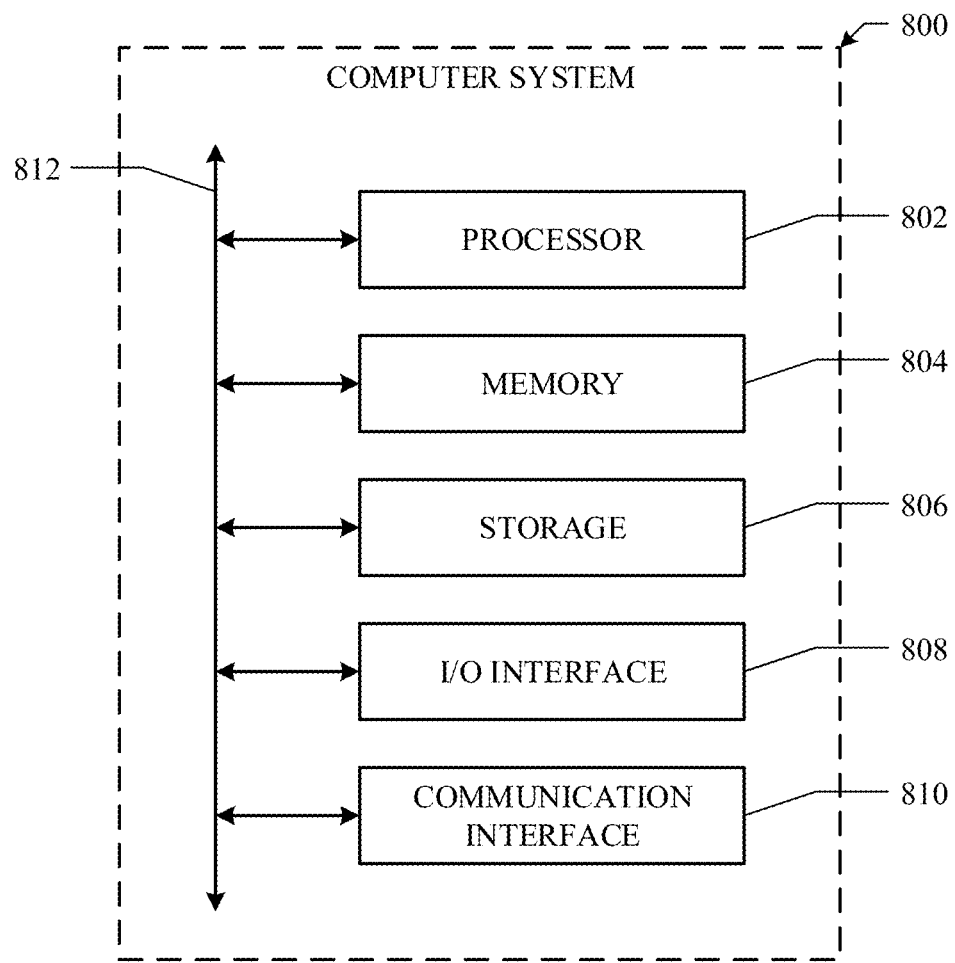
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   receiving, via a user interface of an artificial reality design tool, user instructions for designing an artificial reality effect at a user-specified target resolution and a target file size, wherein the artificial reality effect is generated using a plurality of images of different characteristics;
   generating, for each of the plurality of images, a plurality of compressed images using a plurality of different compression settings, respectively, wherein different compression settings are automatically selected, for different images of the artificial reality effect, based on the user-specified target resolution, the target file size, and characteristics associated with each image;
   computing, for each of the plurality of compressed images, a quality score based on the compressed image and the associated image from which the compressed image is generated;
   determining a desired quality threshold corresponding to the user-specified target resolution specified by the user via the user interface of the artificial reality design tool;
   determining, for each of the plurality of images, an optimal compression setting for compressing the image based on the desired quality threshold and quality scores associated with the plurality of compressed images generated from the image, wherein the optimal compression setting corresponds to one of the plurality of different compression settings;
   compressing each of the plurality of images using the associated optimal compression setting to generate a plurality of optimally-compressed images; and
   outputting a file for generating the artificial reality effect, the file containing the plurality of optimally-compressed images that make up the artificial reality effect within the target file size.

2. The method of claim 1, further comprising:
   scaling the plurality of compressed images with respect to the user-specified target resolution received from a user through the user interface; and
   scaling each of the plurality of images with respect to the received user-specified target resolution;
   wherein the quality score for each of the plurality of compressed images is computed based on the associated scaled compressed image and the associated scaled image.

3. The method of claim 1, wherein for a first image of the plurality of images, one or more of the plurality of compressed images generated from the first image are associated with one or more of the quality scores that satisfy the desired quality threshold, wherein the optimal compression setting for the first image is associated with a smallest expected file size among one or more of the plurality of different compression settings used for generating the one or more of the plurality of compressed images.

4. The method of claim 1, wherein at least two of the plurality of optimally-compressed images are generated using different associated optimal compression settings.

5. The method of claim 1, further comprising rendering each of the plurality of optimally-compressed images on a 3D model of the corresponding artificial reality effect for display to a user.

6. The method of claim 1, further comprising displaying an estimated file size of the file containing the plurality of optimally-compressed images.

7. The method of claim 1, wherein the plurality of optimally-compressed images associated with the plurality of images are generated for a first device type, wherein the method further comprises:
   generating, for a second device type, a plurality of second optimally-compressed images associated with the plurality of images using a plurality of second optimal compression settings, wherein the second optimal compression setting associated with at least one of the plurality of images is different from the optimal compression setting associated with the image.

8. The method of claim 1, further comprising:
accessing one or more second images configured to be used for generating the artificial reality effect;
compressing the one or more second images using one or more compression settings specified by a user through the user interface; and
outputting a second file for generating the artificial reality effect, the second file containing the compressed one or more second images with the one or more optimally-compressed images.

9. The method of claim 1, further comprising providing visual inspection of the plurality of optimally-compressed images by toggling between (1) a first display of the artificial reality effect generated using the plurality of images and (2) a second display of the artificial reality effect generated using the plurality of optimally-compressed images.

10. The method of claim 1, wherein the different compression settings are automatically selected further based on a type of device on which the artificial reality effect is to be displayed.

11. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
receiving, via a user interface of an artificial reality design tool, user instructions for designing an artificial reality effect at a user-specified target resolution and a target file size, wherein the artificial reality effect is generated using a plurality of images of different characteristics;
generating, for each of the plurality of images, a plurality of compressed images using a plurality of different compression settings, respectively, wherein different compression settings are automatically selected, for different images of the artificial reality effect, based on the user-specified target resolution, the target file size, and characteristics associated with each image;
computing, for each of the plurality of compressed images, a quality score based on the compressed image and the associated image from which the compressed image is generated;
determining a desired quality threshold corresponding to the user-specified target resolution specified by the user via the user interface of the artificial reality design tool;
determining, for each of the plurality of images, an optimal compression setting for compressing the image based on the desired quality threshold and quality scores associated with the plurality of compressed images generated from the image, wherein the optimal compression setting corresponds to one of the plurality of different compression settings;
compressing each of the plurality of images using the associated optimal compression setting to generate a plurality of optimally-compressed images; and
outputting a file for generating the artificial reality effect, the file containing the plurality of optimally-compressed images that make up the artificial reality effect within the target file size.

12. The system of claim 11, wherein the quality score for each of the plurality of compressed images is computed based on an associated scaled compressed image and an associated scaled image, wherein the associated scaled compressed image is generated by scaling that compressed image with respect to the user-specified target resolution received from a user through the user interface, and the associated scaled image is generated by scaling that associated image from which the compressed image is generated with respect to the user-specified target resolution.

13. The system of claim 11, wherein for a first image of the plurality of images, one or more of the plurality of compressed images generated from the first image are associated with one or more of the quality scores that satisfy the desired quality threshold, wherein the optimal compression setting for the first image is associated with a smallest expected file size among one or more of the plurality of different compression settings used for generating the one or more of the plurality of compressed images.

14. The system of claim 11, wherein at least two of the plurality of optimally-compressed images are generated using different associated optimal compression settings.

15. The system of claim 11, wherein the different compression settings are automatically selected further based on a type of device on which the artificial reality effect is to be displayed.

16. One or more computer-readable non-transitory storage media embodying software that is operable when executed to cause one or more processors to perform operations comprising:
receiving, via user interface of an artificial reality design tool, user instructions for designing an artificial reality effect at a user-specified target resolution and a target file size, wherein the artificial reality effect is generated using one or more a plurality of images of different characteristics;
generating, for each of the plurality of images, a plurality of compressed images using a plurality of different compression settings, respectively, wherein different compression settings are automatically selected, for different images of the artificial reality effect, based on the user-specified target resolution, the target file size, and characteristics associated with each image;
computing, for each of the plurality of compressed images, a quality score based on the compressed image and the associated image from which the compressed image is generated;
determining a desired quality threshold corresponding to the user-specified target resolution specified by the user via the user interface of the artificial reality design tool;
determining, for each of the plurality of images, an optimal compression setting for compressing the image based on the desired quality threshold and quality scores associated with the plurality of compressed images generated from the image, wherein the optimal compression setting corresponds to one of the plurality of different compression settings;
compressing each of the plurality of images using the associated optimal compression setting to generate a plurality of optimally-compressed images; and
outputting a file for generating the artificial reality effect, the file containing the plurality of optimally-compressed images that make up the artificial reality effect within the target file size.

17. The media of claim 16, wherein the quality score for each of the plurality of compressed images is computed based on an associated scaled compressed image and an associated scaled image, wherein the associated scaled compressed image is generated by scaling that compressed image with respect to the user-specified target resolution received from a user through the user interface, and the associated scaled image is generated by scaling that associated image from which the compressed image is generated with respect to the user-specified target resolution.

18. The media of claim 16, wherein for a first image of the plurality of images, one or more of the plurality of compressed images generated from the first image are associated with one or more of the quality scores that satisfy the desired quality threshold, wherein the optimal compression setting for the first image is associated with a smallest expected file size among one or more of the plurality of different compression settings used for generating the one or more of the plurality of compressed images.

19. The media of claim 16, wherein at least two of the plurality of optimally-compressed images are generated using different associated optimal compression settings.

20. The media of claim 16, wherein the different compression settings are automatically selected further based on a type of device on which the artificial reality effect is to be displayed.

* * * * *